(12) United States Patent
McCullough et al.

(10) Patent No.: US 10,994,835 B2
(45) Date of Patent: May 4, 2021

(54) INERTIA WEIGHT ASSEMBLIES FOR ROTORCRAFT

(71) Applicant: Textron Innovations Inc., Providence, RI (US)

(72) Inventors: John Richard McCullough, Fort Worth, TX (US); Paul K. Oldroyd, Fort Worth, TX (US); Brett Rodney Zimmerman, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 128 days.

(21) Appl. No.: 15/718,592

(22) Filed: Sep. 28, 2017

(65) Prior Publication Data
US 2019/0092458 A1 Mar. 28, 2019

(51) Int. Cl.
*B64C 27/00* (2006.01)
*B64C 27/06* (2006.01)
*B64C 27/473* (2006.01)

(52) U.S. Cl.
CPC ............ *B64C 27/008* (2013.01); *B64C 27/06* (2013.01); *B64C 27/473* (2013.01)

(58) Field of Classification Search
CPC ..... B64C 27/06; B64C 27/008; B64C 27/463; B64C 27/473; B64C 27/028; B22D 19/00; B29D 99/0028; Y10T 29/49808
USPC .................... 416/134 A, 229 R; 428/557, 75
See application file for complete search history.

(56) References Cited

U.S. PATENT DOCUMENTS

| 2,589,193 | A | * | 3/1952 | Mayne | B64C 27/473 244/123.1 |
| 2,754,917 | A | * | 7/1956 | Kee | B64C 27/46 416/144 |
| 3,999,888 | A | * | 12/1976 | Zincone | B64C 27/008 416/145 |
| 4,150,920 | A | * | 4/1979 | Belko | B64C 27/473 416/145 |
| 4,650,534 | A | * | 3/1987 | Mussi | B64C 27/473 156/245 |
| 5,430,937 | A | * | 7/1995 | Leahy | B29C 70/446 29/889.6 |

(Continued)

OTHER PUBLICATIONS

MasterBond; Composite to Metal Adhesives Bonding, (n.d.). Retrieved from https://www.masterbond.com/applications/composite-metal-adhesives-bonding. (Year: 2016).*

(Continued)

*Primary Examiner* — Woody A. Lee, Jr.
*Assistant Examiner* — Hakeem M Abdellaoui
(74) *Attorney, Agent, or Firm* — Lawrence Youst PLLC

(57) ABSTRACT

An inertia weight assembly positionable within a receiving portion of a rotor blade for use on a rotorcraft. The inertia weight assembly includes a weighted core and a casing having a closed outboard end and forming a cavity. The weighted core is disposed in the cavity such that the casing at least partially encloses the weighted core. The weighted core is formed from a first material and the casing is formed from a second material that is dissimilar to the first material. The casing provides an interface between the weighted core and the receiving portion of the rotor blade. The second material is more bondable to the receiving portion of the rotor blade than the first material.

16 Claims, 7 Drawing Sheets

(56) References Cited

U.S. PATENT DOCUMENTS

| | | | | |
|---|---|---|---|---|
| 5,462,409 | A | * | 10/1995 | Frengley ................. B64C 27/46 416/144 |
| 6,196,066 | B1 | * | 3/2001 | Barbier ................. B64C 27/008 73/456 |
| 9,103,009 | B2 | * | 8/2015 | Prest ......................... C22F 1/00 |
| 10,723,438 | B2 | * | 7/2020 | Measom ............... B29C 70/446 |
| 2010/0162565 | A1 | * | 7/2010 | Mukherji .................. B23P 6/00 29/889.1 |
| 2012/0301299 | A1 | * | 11/2012 | Sherrill ................. B64C 27/473 416/144 |
| 2014/0086750 | A1 | * | 3/2014 | Cawthorne ........... B64C 27/473 416/145 |
| 2015/0064013 | A1 | * | 3/2015 | Measom ................. B64C 11/26 416/226 |
| 2018/0036792 | A1 | * | 2/2018 | Tallman ................. B33Y 10/00 |
| 2018/0135728 | A1 | * | 5/2018 | Paulson ............... B64C 11/008 |

OTHER PUBLICATIONS

Mars Metal; Bridge Weights, (n.d.). Retrieved from https://marsmetal.com/counterweights/bridge-weights/. (Year: 2016).*

* cited by examiner

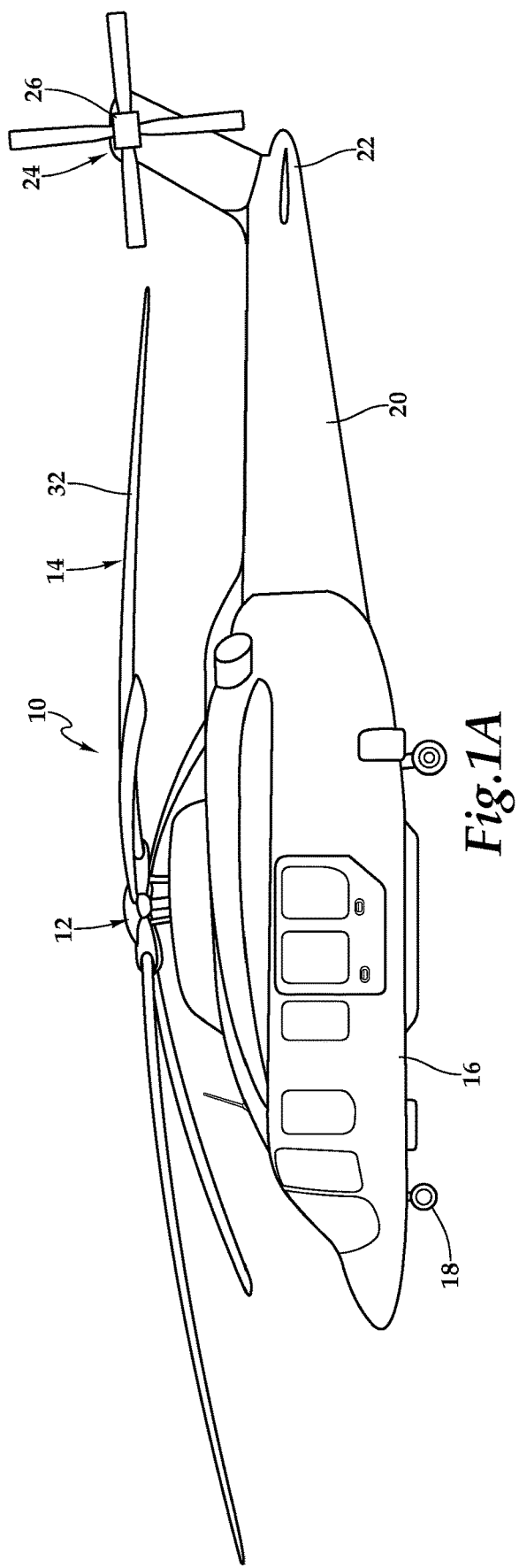
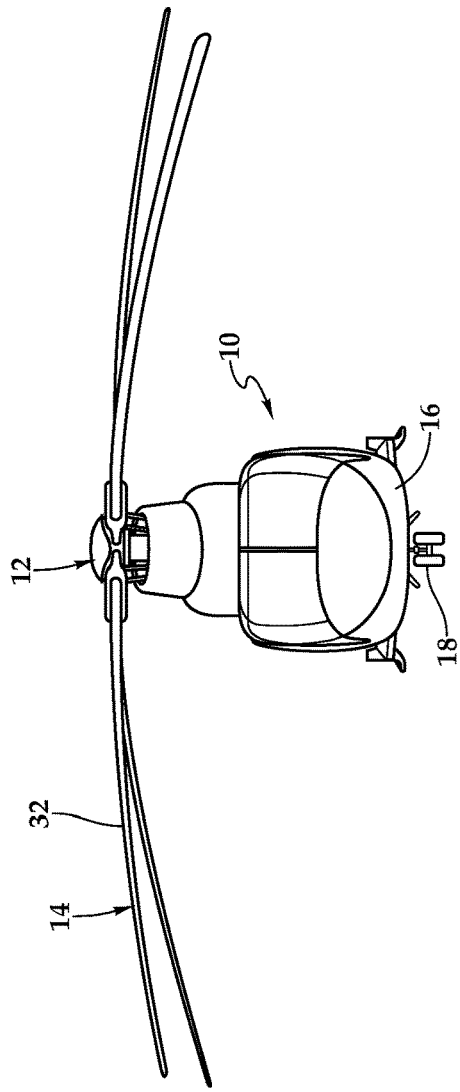

INERTIA WEIGHT ASSEMBLIES FOR ROTORCRAFT

TECHNICAL FIELD OF THE DISCLOSURE

The present disclosure relates, in general, to inertia weights for use in rotor blades of rotorcraft to facilitate autorotation of the main rotor after an engine disengagement therefrom and, in particular, to inertia weight assemblies having a weighted core disposed within a casing that provides an interface with the rotor blade.

BACKGROUND

While rotating, the main rotor of a helicopter has rotational inertia, which is the tendency of the main rotor to remain rotating unless a torque is applied thereto. The rotational inertia of the main rotor depends largely upon the mass and mass distribution of the rotor blades. Inertia weights, typically positioned near the tips of the rotor blades, may be used to increase the rotational inertia of the main rotor. For example, inertia weights may be used to maintain dynamic balance for the main rotor, improve performance at the operating frequency of the main rotor and improve safety while the main rotor is increasing rotational velocity (RPM) from a stop position. Inertia weights may also facilitate autorotation of the main rotor, which occurs when the engine is disengaged from the main rotor and the rotor blades are driven by the upward flow of air therethrough. Autorotation allows a pilot to safely land the helicopter and may be utilized in response to engine or tail rotor failure. Inertia weights can provide the additional inertia necessary for the main rotor to successfully perform autorotation. For example, increasing the rotational inertia of the main rotor using inertia weights reduces RPM decay, thereby increasing the amount of time a pilot has to prevent stall after the engine disengages.

It has been found, however, that centrifugal force generated by the rotation of the main rotor can force the inertia weight material to move relative to the rotor blade, including movement caused by circularization, hoop stress or bulging. In some cases, centrifugal force can cause the inertia weight material to be extruded toward or even out of the tip of the rotor blade. Such movement of the inertia weight can lead to rotor imbalances or failures. In addition, current inertia weights have a propensity to disbond from the rotor blade due to poor bonding characteristics between the inertia weight material and the rotor blade material.

SUMMARY

In a first aspect, the present disclosure is directed to an inertia weight assembly positionable within a receiving portion of a rotor blade for use on a rotorcraft. The inertia weight assembly includes a weighted core and a casing having a closed outboard end and forming a cavity. The weighted core is disposed in the cavity such that the casing at least partially encloses the weighted core. The casing provides an interface between the weighted core and the receiving portion of the rotor blade.

In some embodiments, the weighted core may include a first material and the casing may include a second material that is dissimilar to the first material. In certain embodiments, the first material may include lead and the second material may include steel. In some embodiments, the second material may be more bondable to the receiving portion of the rotor blade than the first material. In other embodiments, the second material may include a woven metallic material, an adhesive-infused woven metallic material and/or a composite material. In certain embodiments, the weighted core may be coupled to the casing. In some embodiments, the weighted core may be bonded to the casing using adhesive. The casing may include an open or closed inboard end. In certain embodiments, the casing may include a spanwise tapered casing. In some embodiments, the casing may include vent holes. In certain embodiments, the casing may include tension rods extending through the cavity between walls of the casing. In some embodiments, the casing may include ribs disposed within the cavity on an inner surface of the casing.

In a second aspect, the present disclosure is directed to a rotor blade assembly including a rotor blade having a receiving portion and at least one inertia weight assembly disposed within the receiving portion of the rotor blade. The inertia weight assembly includes a casing having a closed outboard end and forming a cavity and a weighted core disposed in the cavity such that the casing at least partially encloses the weighted core. The weighted core is formed from a first material and the casing is formed from a second material that is dissimilar to the first material. The second material is more bondable to the receiving portion of the rotor blade than the first material. The casing provides an interface between the weighted core and the receiving portion of the rotor blade.

In some embodiments, the first material may include lead and the second material may include steel. In certain embodiments, the rotor blade may include a leading section and the receiving portion of the rotor blade may be located in the leading section. In some embodiments, the rotor blade may include a tip region and the receiving portion of the rotor blade may be located in the tip region. In certain embodiments, the casing may be coupled to the receiving portion of the rotor blade. In some embodiments, the casing may be bonded to the receiving portion of the rotor blade. In certain embodiments, the inertia weight assembly may include a plurality of inertia weight assemblies.

In a third aspect, the present disclosure is directed to a rotorcraft including a fuselage and a main rotor rotatable relative to the fuselage. The main rotor includes a plurality of rotor blades each having a receiving portion located in a leading section of a tip region. The rotorcraft also includes a plurality of inertia weight assemblies each disposed within one of the receiving portions of the rotor blades. Each inertia weight assembly includes a casing having a closed outboard end and forming a cavity and a weighted core disposed in the cavity such that the casing at least partially encloses the weighted core. The weighted core is formed from a first material and the casing is formed from a second material that is dissimilar to the first material. The second material is more bondable to the receiving portion of the rotor blade than the first material. The casing provides an interface between the weighted core and the receiving portion of the rotor blade.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 1A-1C are schematic illustrations of a rotorcraft having inertia weight assemblies in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1C:
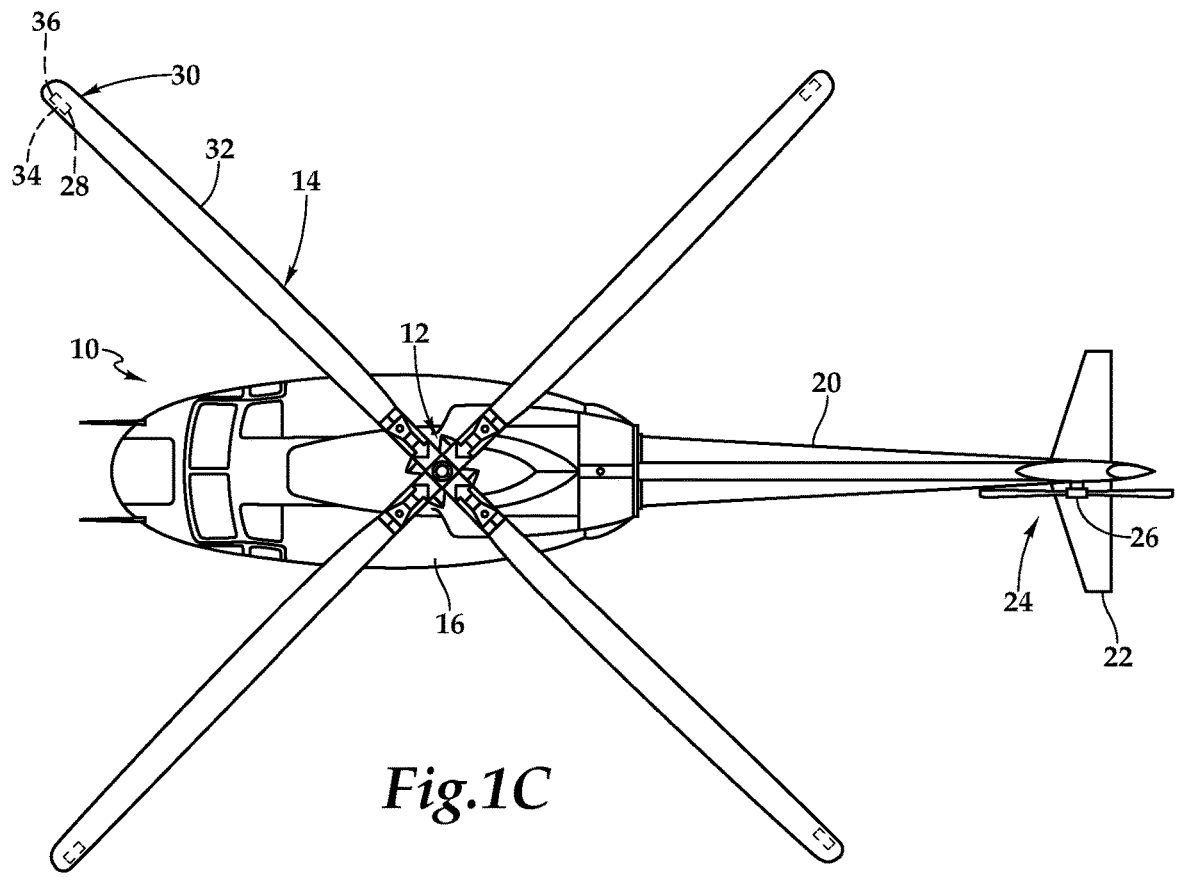

Referring to FIGS. 1A-1C in the drawings, a rotorcraft is schematically illustrated and generally designated 10. Rotorcraft 10 is a helicopter having a main rotor 12, which includes a plurality of rotor blade assemblies 14. Main rotor 12 is rotatable relative to a fuselage 16 of rotorcraft 10. The pitch of rotor blade assemblies 14 can be collectively and/or cyclically manipulated to selectively control direction, thrust and lift of rotorcraft 10. A landing gear system 18 provides ground support for rotorcraft 10. A tailboom 20 extends from fuselage 16, and has an aft portion 22. A tail rotor 24 includes a tail main rotor 26 that is rotatably coupled to aft portion 22 of tailboom 20. Tail rotor 24 controls the yaw of rotorcraft 10.

Rotor blade assemblies 14 each include an inertia weight assembly 28 located in a tip region 30 of a rotor blade 32. Preferably, inertia weight assemblies 28 are coupled to rotor blades 32 by bonding using an adhesive such as an epoxy, however, inertia weight assemblies 28 could be coupled to rotor blades 32 using mechanical fasteners or other suitable technique. Inertia weight assemblies 28 increase the rotational inertia of main rotor 12 and are useful in maintaining the dynamic balance of main rotor 12, improving the performance and safety of rotorcraft 10 and allowing rotorcraft 10 to effectively perform various maneuvers, such as autorotation. The undesired movement or loss of an inertia weight in a helicopter can be detrimental or even catastrophic. For example, the centrifugal forces acting upon inertia weights can shift or move one or more of the inertia weights outboard toward the tip of the rotor blade(s), which can cause imbalances for the main rotor during operation. Previous inertia weights have also had a tendency to disbond from the rotor blades to which they are attached. A disbonded inertia weight can more easily move relative to the rotor blade to which it is attached and cause severe imbalances for the main rotor. It is therefore important that inertia weights be retained in their intended position.

In the illustrative embodiments, each inertia weight assembly 28 has a weighted core (not shown), such as a lead core, at least partially enclosed by a casing 34, such as a steel casing. Casings 34 have closed outboard ends 36 that prevent the weighted cores therein from moving outboard toward the tips of rotor blade assemblies 14 during operation. Each casing 34 also provides an interface between the weighted core and the rotor blade 32 to which it is coupled. Because the material of casings 34 is capable of forming a stronger and longer-lasting bond to rotor blades 32 as compared to the material of weighted cores, casings 34 reduce movement of the weighted cores relative to rotor blades 32 and reduce or eliminate the propensity of inertia weight assemblies 28 to disbond from rotor blades 32.

It should be appreciated that rotorcraft 10 is merely illustrative of a variety of aircraft that can implement the embodiments disclosed herein. Indeed, inertia weight assemblies 28, including casings 34, may be utilized on any aircraft having a rotor or rotor blades. Other aircraft implementations can include hybrid aircraft, tiltrotor aircraft, tiltwing aircraft, quad tiltrotor aircraft, unmanned aircraft, gyrocopters, propeller-driven airplanes and the like. As such, those skilled in the art will recognize that inertia weight assemblies 28 can be integrated into a variety of aircraft configurations. It should be appreciated that even though aircraft are particularly well-suited to implement the embodiments of the present disclosure, non-aircraft vehicles and devices can also implement the embodiments.

Figure 2A:
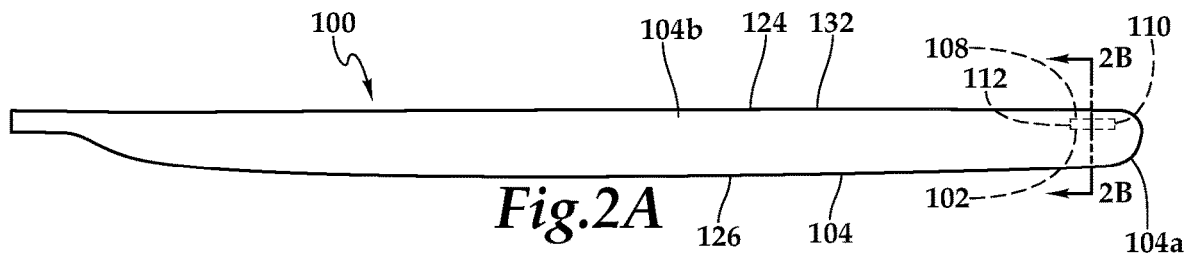
FIGS. 2A-2B are various views of a rotor blade assembly including an inertia weight assembly in accordance with embodiments of the present disclosure.
Figure 2B:
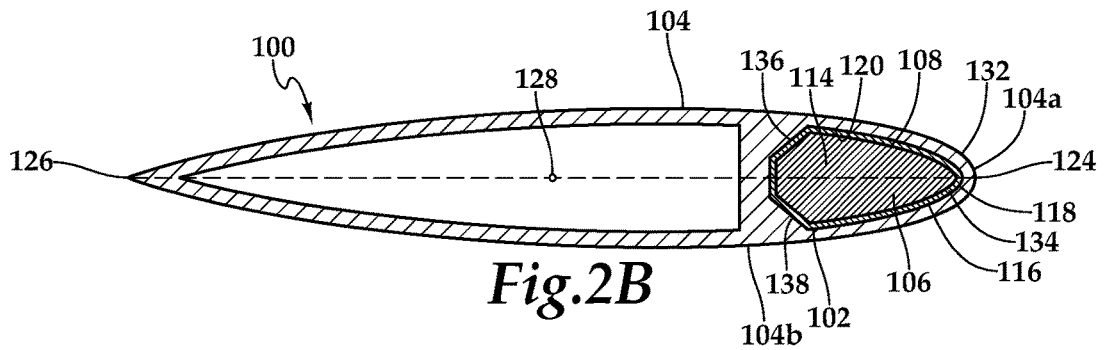
Figure 3A:
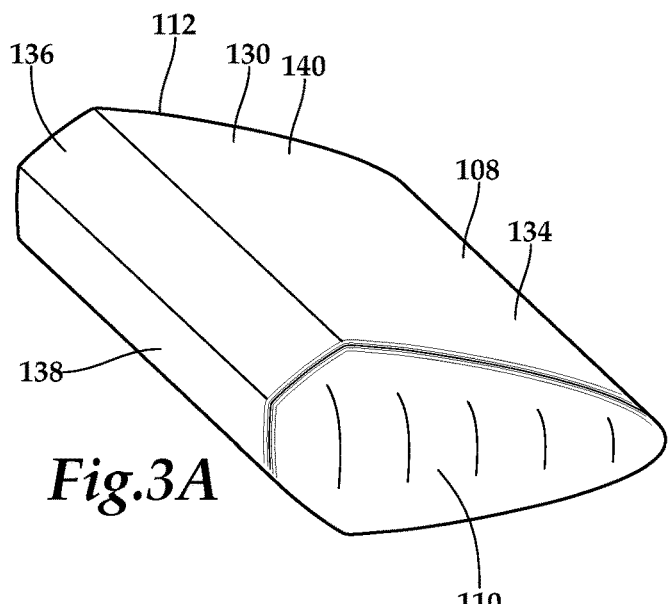
FIGS. 3A-3D are various views of a casing for an inertia weight assembly in accordance with embodiments of the present disclosure.
Figure 3B:
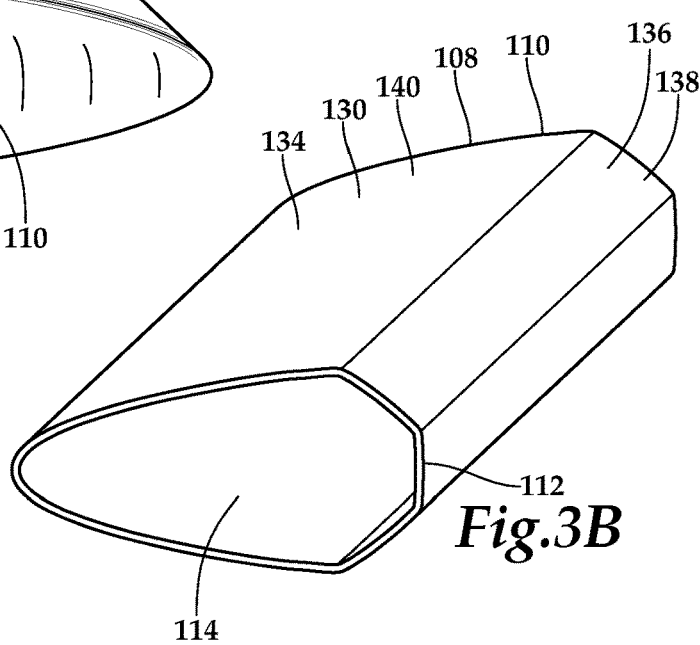
Figure 3C:
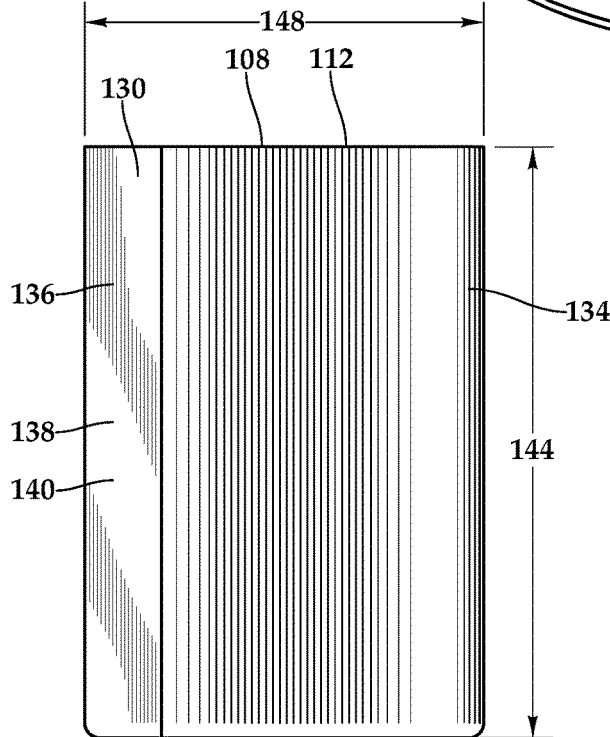
Figure 3D:
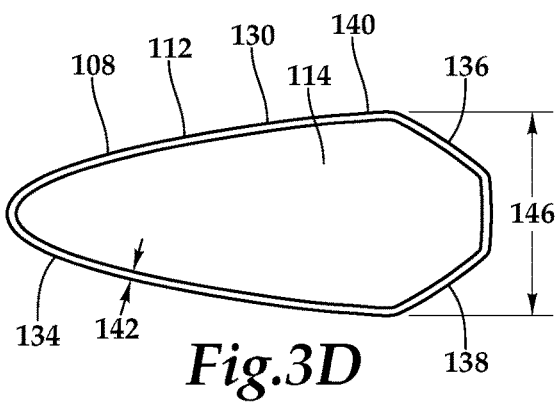

Referring to FIGS. 2A-2B and 3A-3D in the drawings, a rotor blade assembly is schematically illustrated and generally designated 100. Rotor blade assembly 100 includes inertia weight assembly 102 coupled to rotor blade 104. In the illustrated embodiment, inertia weight assembly 102 is coupled to rotor blade 104 by bonding using an adhesive such as an epoxy. In other embodiments, however, inertia weight assembly 102 could be coupled to rotor blade 104 using mechanical fasteners or other suitable technique. Inertia weight assembly 102 is located at tip region 104a of rotor blade 104. Inertia weight assembly 102 includes weighted core 106, which may be a dense or ballast material used to create loads by inertia. Inertia weight assembly 102 also includes casing 108, which has a closed outboard end 110 and an open inboard end 112. Casing 108 forms a cavity 114. Weighted core 106 is disposed in cavity 114 such that casing 108 may partially or fully enclose weighted core 106. Rotor blade 104 includes a receiving portion 116 that is adapted to receive casing 108. As best seen in FIG. 2B, which is a cross-sectional view of FIG. 2A taken along line 2B-2B, receiving portion 116 includes a receiving cavity 118 having inner wall 120. Casing 108 is coupled to inner wall 120 such that casing 108 is disposed inside receiving cavity 118.

Receiving cavity 118 is located in a leading chordwise section 104b of rotor blade 104, placing inertia weight assembly 102 closer to nose 124 than trailing edge 126 of rotor blade assembly 100. Positioning receiving cavity 118 at leading section 104b places the center of mass contributed by inertia weight assembly 102 towards the front of rotor blade assembly 100. Leading section 104b and receiving cavity 118 of rotor blade 104 are located forward of chord midpoint 128. It will be appreciated by one of ordinary skill in the art that inertia weight assembly 102 may be located at any spanwise or chordwise position along rotor blade 104.

Casing 108 may be bonded to inner wall 120 using adhesive. In other embodiments, casing 108 may be coupled to inner wall 120 using one or more fasteners, such as bolts. Indeed, casing 108 may be coupled to receiving cavity 118 of rotor blade 104 in a variety of ways, including by mere contact. The geometry or shape of casing 108 may vary based on the shape and/or properties of rotor blade 104 or other factors. For example, casing 108 may be shaped to maximize the area of its outer surface 130, thereby providing more area by which to bond with receiving cavity 118 and strengthening the bond between rotor blade 104 and casing 108. In the illustrated embodiment, casing 108 contours inner wall 120 of receiving cavity 118, and vice versa. Rotor blade 104 and casing 108 have leading sides 132, 134, respectively, which have a generally airfoil shape and contour one another. Trailing side 136 protrudes in an aft direction to taper from increasing to decreasing thickness. Trailing side 136 of casing 108 includes three flat surfaces 138, although trailing side 136 of casing 108 may include any number of flat surfaces. Trailing side 136 may also be rounded or any other shape.

Walls 140 of casing 108 may be any suitable thickness 142. For example, casing walls 140 may be just thick enough to maintain the shape of casing 108 and/or may be just strong enough to contain weighted core 106 as a hydrostatic material or pressure field. In some embodiments, casing walls 140 may be in a range between 10-40 thousandths of an inch, such as approximately 25 thousandths of an inch. Casing 108 may also have any length 144, thickness 146 or depth 148 suitable for the particular rotor blade or rotorcraft to which inertia weight assembly 102 is coupled. For example, length 144 of casing 108 may be in a range between approximately 3-12%, such as approximately 8%, of the spanwise length of rotor blade 104. In this non-limiting example, if rotor blade 104 has a spanwise length of 18 feet, length 144 of casing 108 may be in a range between approximately 8-25 inches, such as approximately 18 inches. As illustrated, thickness 146 of casing 108 varies chordwise, and in some embodiments, depth 148 of casing 108 may vary spanwise. Weighted core 106 may be coupled or bonded within cavity 114 to casing 108 using fasteners, adhesive or any suitable coupling technique.

Weighted core 106 may be formed from a dense or ballast material. Non-limiting examples of materials from which weighted core 106 may be formed include lead, lead antimony or tungsten. Such materials, if bonded directly to rotor blade 104, have a propensity to disbond from rotor blade components due, at least in part, to the malleability the weighted core material and/or weakness at the subsurface of the weighted core material adjacent to the bond. These properties result in an inertia weight formed entirely from the weighted core material being extremely difficult to bond to another component, particularly when the bonded coupling will be subject to extreme loads such as those generated responsive to the centrifugal force of a rotor system. In the present disclosure, this drawback is overcome by forming casing 108 from a material dissimilar to that of weighted core 106 that has preferential bonding characteristics including lower malleability and/or greater subsurface strength. Non-limiting examples of materials from which casing 108 may be formed include steel, such as corrosion resistant steel, FN300, AF163, aluminum, titanium or other preferentially bondable metallic material. In other embodiments, casing 108 may be formed from a non-metallic material. Casing 108 may also be formed from a woven, or braided, metallic material, an adhesive-infused woven metallic material and/or a composite material. In embodiments in which casing 108 is formed from an adhesive-infused woven metallic material, any adhesive capable of bonding to rotor blade 104 may be infused, integrated, coated or otherwise disposed on casing 108. Adhesive may also be infused or otherwise disposed on casings 108 formed from a material other than a woven metallic material. The material of casing 108 is more bondable to receiving portion 116 of rotor blade 104 than the material of weighted core 106 such that a stronger, more durable bond may be formed therewith. Accordingly, the use of inertia weight assembly 102 having casing 108 at least partially enclosing weighted core 106 results in a more long-lasting and stable bond between inertia weight assembly 102 and rotor blade 104 than bonding an inertia weight formed entirely of the material of weighted core 106.

The superior bonding characteristics of casing 108, as compared to weighted core 106, provide an interface between weighted core 106 and receiving portion 116 of rotor blade 104 that reduces disbonding between inertia weight assembly 102 and receiving portion 116 as well as reduces movement of weighted core 106 relative to rotor blade 104. Casing 108 thus reduces undesirable movement, spanwise or otherwise, of the center of mass of inertia weight assembly 102, whether due to disbonding between inertia weight assembly 102 and rotor blade 104 or movement of weighted core 106. For example, closed outboard end 110 of casing 108 operates to prevent outboard movement of weighted core 106 by acting as a barrier that prevents the centrifugal forces produced by the rotor from forcing weighted core 106 toward the tip of rotor blade 104. Casing 108 may also act as a pocket in which loads produced by weighted core 106 are transferred as membrane loads into casing 108, which is desirable because casing 108 is more capable of producing a strong bond with rotor blade 104. Thus, the illustrative embodiments may transfer the inertia load through a membrane (i.e., casing 108) rather than through classical bending and shear. When subject to the high centrifugal forces generated by the rotor, weighted core 106 may act as a fluid housed in a membrane and can therefore be subject to phenomena such as circularization, hoop stress or bulging. The existence of such phenomena, however, does not negate the effectiveness of casing 108 due to the membrane properties of casing 108.

Inertia weight assembly 102 may be manufactured or assembled in a variety of ways. In some embodiments, weighted core 106 may be poured into casing 108 while weighted core 106 is in liquid form. While the liquefied weighted core is being poured, casing 108 may be reinforced using additional tooling, such as porcelain tooling, to prevent casing 108 from changing shape and ensuring that casing 108 will properly fit into receiving cavity 118. The liquefied weighted core may then harden within cavity 114 to form inertia weight assembly 102. In other embodiments, inertia weight assembly 102 may be mechanically assembled using weighted core 106 and casing 108 in their solid forms, in which case weighted core 106 may be coupled within cavity 114 of casing 108 using fasteners, adhesive or any suitable coupling technique. In other embodiments, weighted core 106 may be contained or held in cavity 114 of casing 108 by mere contact without the use of any external coupling devices. In some embodiments, casing 108 may be an assembly having two or more walls or portions that are mechanically fastened or adhered together to form casing 108. In certain embodiments, outer surface 130 of casing 108 may be subject to bond surface preparation prior to being received by receiving portion 116 of rotor blade 104. For example, outer surface 130 may be grit blasted, sanded or sand blasted followed by the application of alcohol to remove debris.

Inertia weight assembly 102 may be utilized in a rotor blade having any material composition. For example, rotor blade 104 may be formed from fiberglass, carbon, such as carbon epoxy, composite, thermoplastic, metallic material, such as aluminum, wood or any other material. Rotor blade 104 may also include any types of components, such as one or more heat shields, sheaths, heater blankets, spars, erosion shields, abrasion resistant layers or other components. Such components of rotor blade 104 may be coupled to one another in any number of ways, including by the use of fasteners or adhesive.

Figure 4A:
FIGS. 4A-4F are plan views of different rotor blade assemblies including inertia weight assemblies in various configurations in accordance with embodiments of the present disclosure.
Figure 4B:
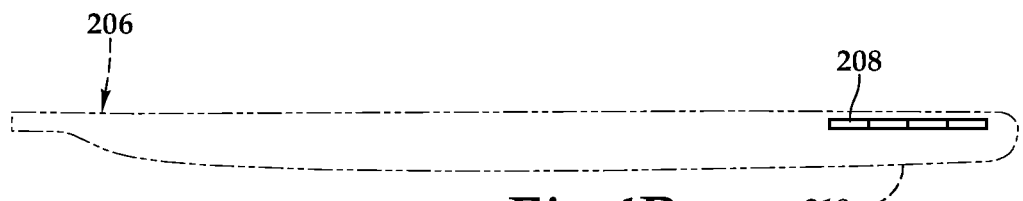
Figure 4C:
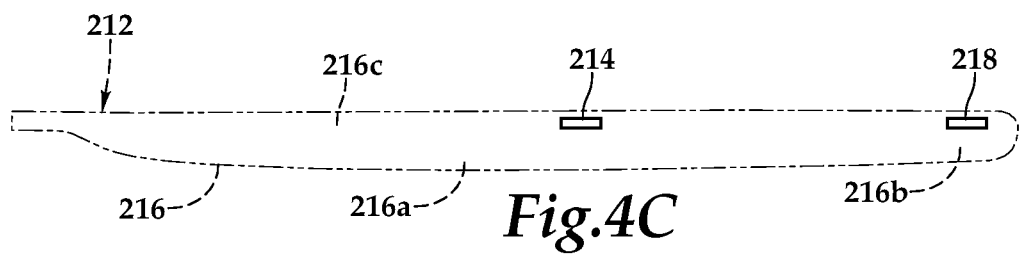
Figure 4D:
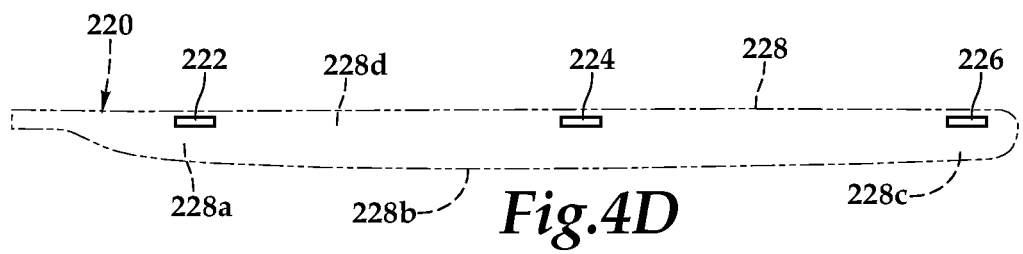

Referring to FIGS. 4A-4F in the drawings, rotor blade assemblies having inertia weight assemblies in various positions and configurations are schematically illustrated. In FIG. 4A, rotor blade assembly 200 includes two inertia weight assemblies 202 coupled to rotor blade 204. Inertia weight assemblies 202 are located along leading section 204a of tip region 204b of rotor blade 204. Any number of inertia weight assemblies may be coupled to tip region 204b of rotor blade 204. For example, rotor blade assembly 206, illustrated in FIG. 4B, includes four inertia weight assemblies 208 coupled to rotor blade 210. The number and position of the inertia weight assemblies for a particular rotor blade assembly may depend on the size, shape or aerodynamics of the rotor blade as well as other factors particular to the rotorcraft to which it is attached. In FIG. 4C, rotor blade assembly 212 includes inertia weight assembly 214 coupled to rotor blade 216 at midspan region 216a. Rotor blade assembly 212 also includes inertia weight assembly 218 located at tip region 216b. Both inertia weight assemblies 214, 218 are located along leading section 216c of rotor blade 216. Although rotor blade assembly 212 is illustrated as having inertia weight assemblies 214, 218 in midspan and tip regions 216a, 216b of rotor blade 216, respectively, in other embodiments inertia weight assembly 218 in tip region 216b may be omitted so that rotor blade assembly 212 includes one or more inertia weight assemblies only at midspan region 216a. In FIG. 4D, rotor blade assembly 220 includes inertia weight assemblies 222, 224, 226 coupled to rotor blade 228 at root region 228a, midspan region 228b and tip region 228c, respectively. Inertia weight assemblies 222, 224, 226 are all located along leading section 228d of rotor blade 228. In other embodiments, rotor blade assembly 220 may include one or more inertia weight assemblies only at root region 228a of rotor blade 228. Indeed, any number of inertia weight assemblies may be positioned anywhere, spanwise or chordwise, along rotor blade 228.

Figure 4E:
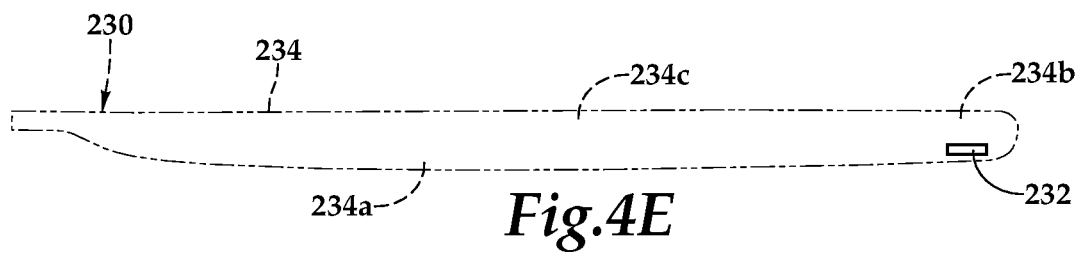
Figure 4F:
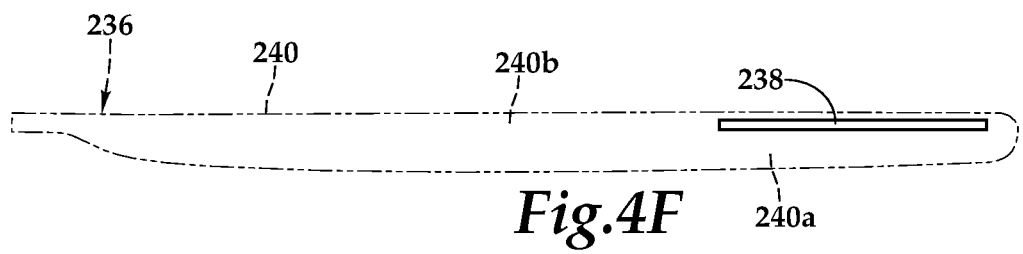

In FIG. 4E, rotor blade assembly 230 includes inertia weight assembly 232 coupled to rotor blade 234 along trailing section 234a of tip region 234b. Rotor blade assembly 230 may include any number of inertia weight assemblies along trailing section 234a of rotor blade 234. Any number of inertia weight assemblies along trailing section 234a may also be used in combination with one or more inertia weight assemblies along leading section 234c of rotor blade 234. In FIG. 4F, rotor blade assembly 236 includes an elongated inertia weight assembly 238 coupled to rotor blade 240 at outboard region 240a. Elongated inertia weight assembly 238 may have any spanwise length up to 100% of the span of rotor blade 240. In another example, the spanwise length of elongated inertia weight assembly 238 may be in a range between 25-75% of the span of rotor blade 240. While elongated inertia weight assembly 238 is illustrated as being located along leading section 240b of rotor blade 240, elongated inertia weight assembly 238 may be disposed at any chordwise location of rotor blade 240. Elongated inertia weight assembly 238 may also be located anywhere along the span of rotor blade 240.

Figure 5:
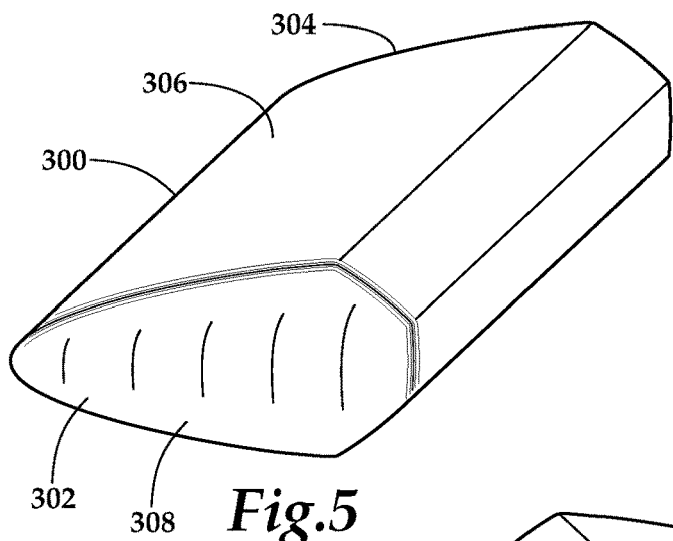
FIG. 5 is an isometric view of a casing for an inertia weight assembly having a closed inboard end in accordance with embodiments of the present disclosure.
Figure 6:
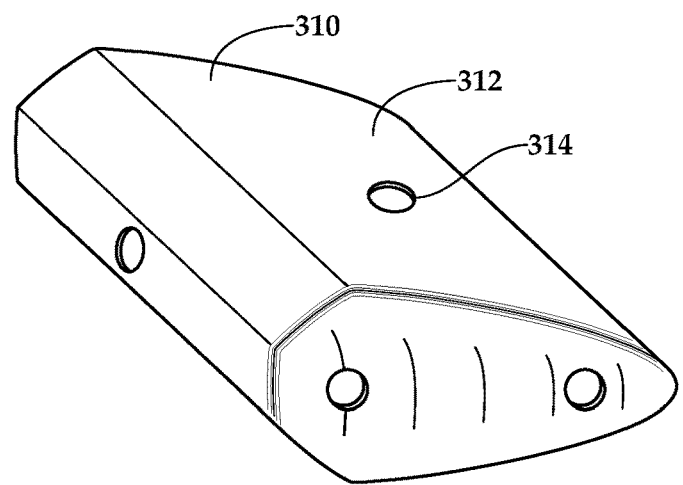
FIG. 6 is an isometric view of a casing for an inertia weight assembly having vent holes in accordance with embodiments of the present disclosure.

Referring to FIG. 5 in the drawings, inertia weight assembly 300 has a closed inboard end 302 such that both the inboard and outboard ends 302, 304 of casing 306 are closed off or sealed. After the weighted core has been poured or otherwise placed into casing 306, inboard end 302 may be closed with a lid 308, curve-shaped or otherwise, which may be coupled to casing 306 using fasteners, adhesive, crimping or any other suitable coupling technique. Referring to FIG. 6 in the drawings, casing 310 of inertia weight assembly 312 includes vent holes 314. In the embodiment in which inertia weight assembly 312 is manufactured or assembled by pouring liquefied weighted core into casing 310, vent holes 314 allow air to vent out of the cavity formed by casing 310 while the liquefied weighted core is poured into the cavity, thereby reducing voids or trapped air pockets as the weighted core hardens. Casing 310 may include any number of vent holes 314, which may be located anywhere on the surface of casing 310.

Figure 7A:
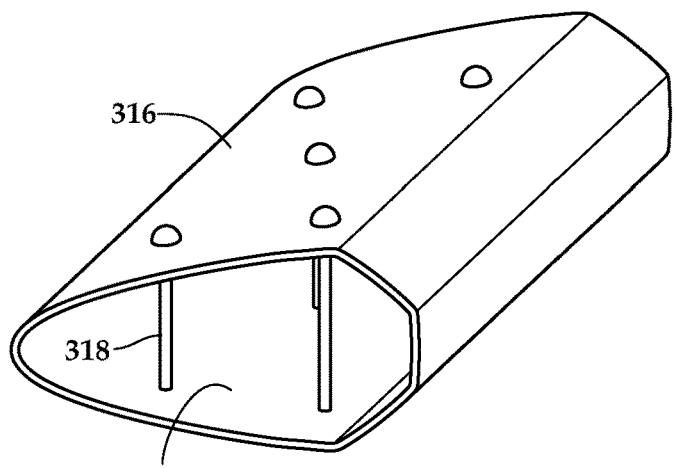
FIGS. 7A-7B are various views of a casing for an inertia weight assembly having stiffening members in accordance with embodiments of the present disclosure.
Figure 7B:
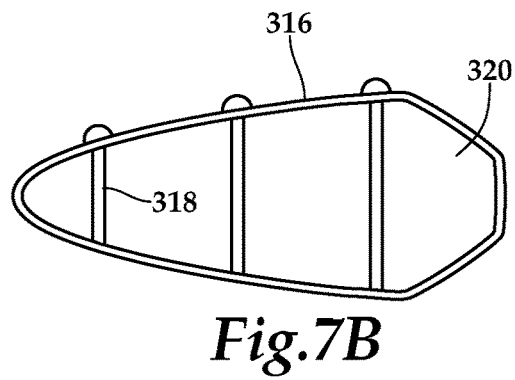
Figure 8A:
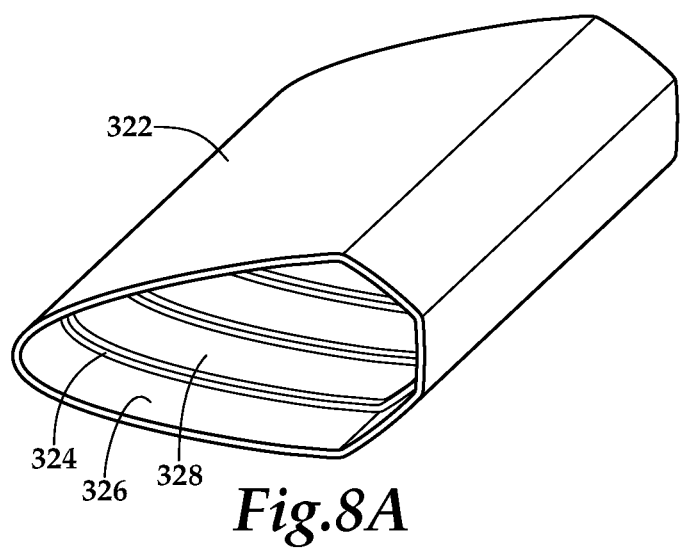
FIGS. 8A-8C are various views of a casing for an inertia weight assembly having stiffening members in accordance with embodiments of the present disclosure.
Figure 8B:
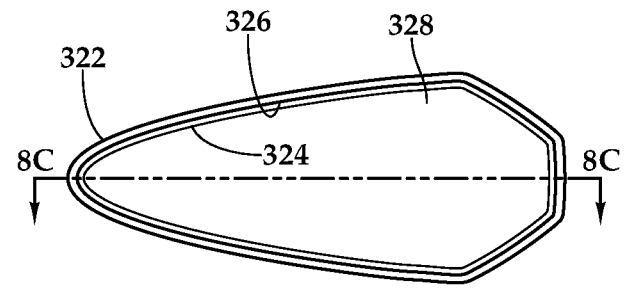
Figure 8C:
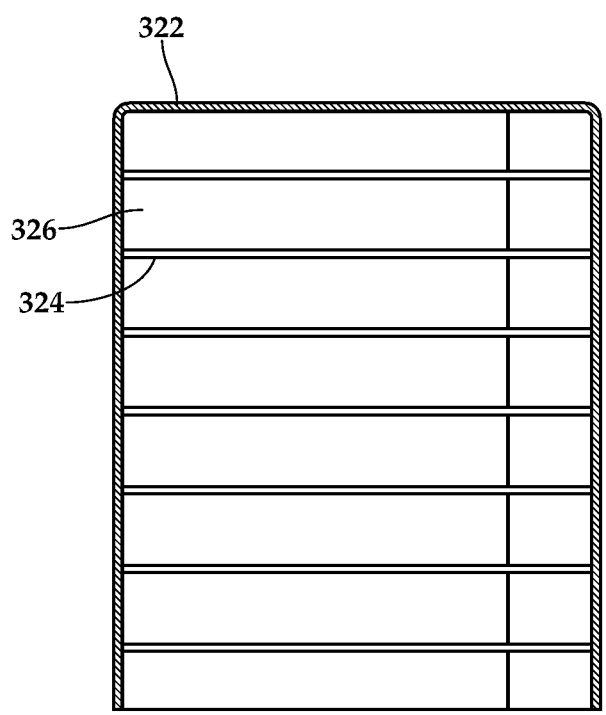

Referring to FIGS. 7A-7B and 8A-8C in the drawings, casings having stiffening members in various configurations are schematically illustrated. In FIGS. 7A-7B, casing 316 includes internal tension carrying rods, or tendons, 318, which extend through cavity 320 between walls formed by casing 316. Internal tension carrying rods 318 are operable to resist deformation of the inertia weight assembly, including casing 316, when exposed to the high acceleration field of rotor dynamics, including effects associated with membrane circularization. Any number of internal tension carrying rods 318 may be employed by casing 316, and internal tension carrying rods 318 may be any length and oriented in any direction. In the illustrated embodiment, internal tension carrying rods 318 are rivets that are installed prior to pouring weighted core into cavity 320. In FIGS. 8A-8C, the stiffening members of casing 322 are ribs 324 that are oriented substantially parallel to one another along inner surface 326 within casing cavity 328. Ribs 324 may act as ring stiffeners that resist deformation of casing 322. Casing 322 may include any number of ribs 324, which may be oriented in any direction. In some embodiments, internal tension carrying rods 318 or ribs 324 may be integral to the fabrication of casings 316, 322, respectively, such as in a casting or additively manufactured part.

Figure 9A:
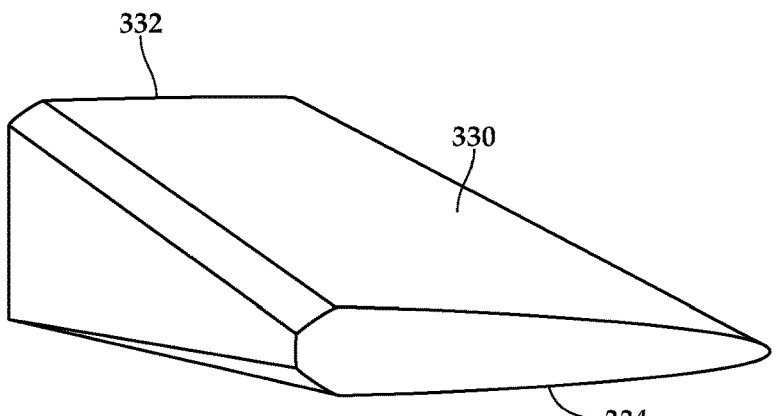
FIGS. 9A-9B are various views of a tapered casing for an inertia weight assembly in accordance with embodiments of the present disclosure.
Figure 9B:
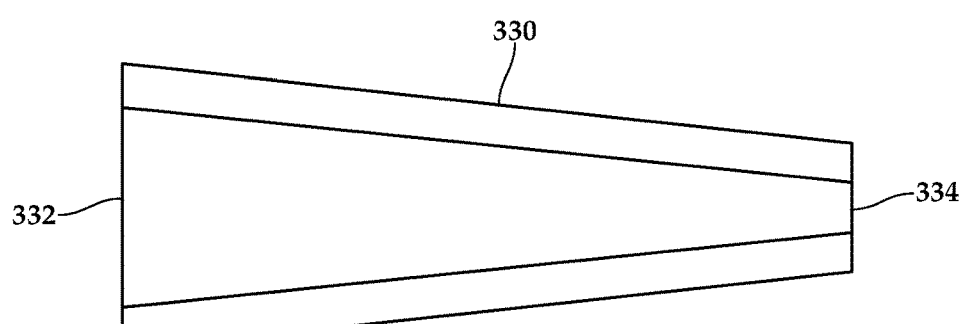
Figure 10A:
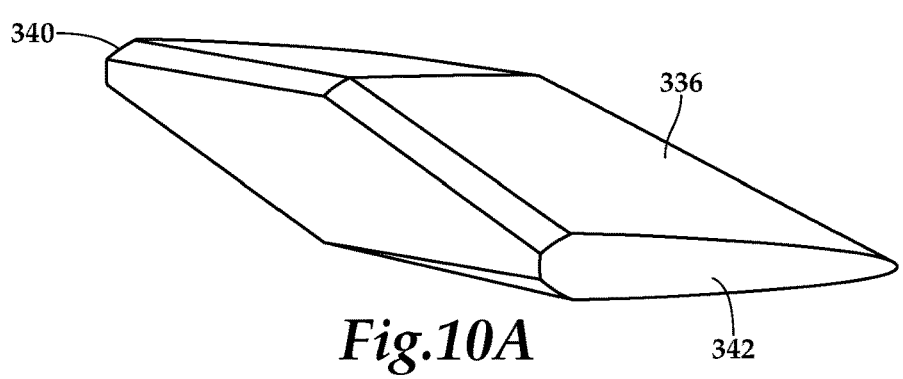
FIGS. 10A-10B are various views of a tapered casing for an inertia weight assembly in accordance with embodiments of the present disclosure.
Figure 10B:
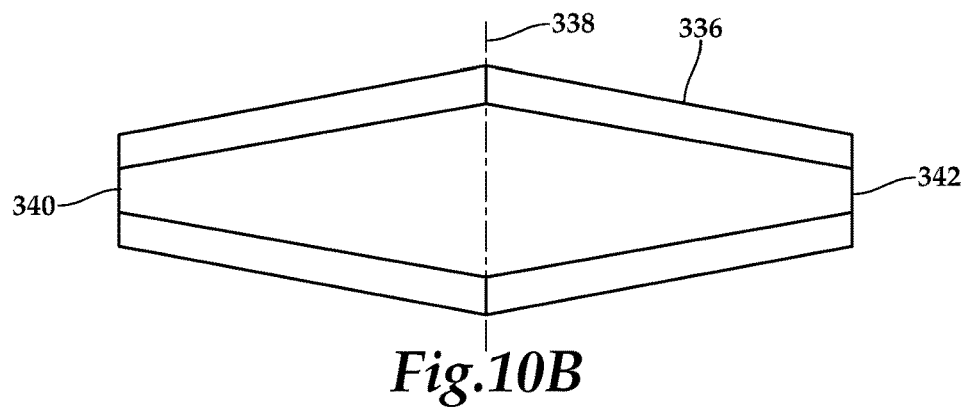

Referring to FIGS. 9A-9B and 10A-10B in the drawings, spanwise tapered casings having various configurations and shapes are schematically illustrated. In FIGS. 9A-9B, casing 330 tapers from increasing to decreasing thickness from inboard end 332 to outboard end 334. Tapering casing 330 in this manner shifts the center of mass of the inertia weight assembly toward inboard end 332. In other embodiments, casing 330 may taper from increasing to decreasing thickness from outboard end 334 to inboard end 332. In FIGS. 10A-10B, casing 336 tapers from increasing to decreasing thickness from spanwise midpoint 338 to inboard and outboard ends 340, 342. Tapering casing 336 in this manner concentrates the center of mass toward the center of the inertia weight assembly. Tapered casings 330, 336 increase the surface area of the inertia weight assembly, which may strengthen the bond between casings 330, 336 and a rotor blade. By tapering the casings, the center of mass may be concentrated in any desired portion of the inertia weight assembly as may be suitable for the particular dynamics of a rotor blade or rotorcraft.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A rotor blade assembly comprising:
   a rotor blade having a receiving portion; and
   at least one inertia weight assembly disposed within the receiving portion of the rotor blade, the at least one inertia weight assembly comprising:
   a casing having a closed outboard end to form a cavity; and
   a weighted core disposed in the cavity such that the casing at least partially encloses the weighted core;
   wherein, the casing is interposed between the weighted core and the receiving portion of the rotor blade;
   wherein, the casing is formed from a woven metallic material; and
   wherein, the casing includes at least one of: vent holes, ribs, or tension carrying rods installed prior to pouring the weighted core into the cavity.

2. The rotor blade assembly as recited in claim 1 wherein the rotor blade further comprises a leading section and wherein the receiving portion of the rotor blade is located in the leading section.

3. The rotor blade assembly as recited in claim 1 wherein the rotor blade further comprises a tip region and wherein the receiving portion of the rotor blade is located in the tip region.

4. The rotor blade assembly as recited in claim 1 wherein the casing is bonded within the receiving portion of the rotor blade.

5. The rotor blade assembly as recited in claim 1 wherein the weighted core further comprises a first material and wherein the casing further comprises a second material that is dissimilar to the first material.

6. The rotor blade assembly as recited in claim 5 wherein the first material further comprises lead and the second material further comprises steel.

7. The rotor blade assembly as recited in claim 5 wherein the second material is more bondable to the receiving portion of the rotor blade than the first material.

8. The rotor blade assembly as recited in claim 1 wherein the casing is formed from an adhesive-infused woven metallic material.

9. The rotor blade assembly as recited in claim 1 wherein the weighted core is bonded to the casing using adhesive.

10. The rotor blade assembly as recited in claim 1 wherein the casing is formed from woven corrosion resistant steel.

11. The rotor blade assembly as recited in claim 1 wherein the casing is formed from woven aluminum.

12. The rotor blade assembly as recited in claim 1 wherein the casing is formed from woven titanium.

13. The rotor blade assembly as recited in claim 1 wherein the casing has a trailing side protruding in an aft direction to taper from increasing to decreasing thickness.

14. The rotor blade assembly as recited in claim 13 wherein the tapered aft end of the casing forms a plurality of flat surfaces.

15. The rotor blade assembly as recited in claim 13 wherein the tapered aft end of the casing includes a substantially vertical flat end surface, a slanted top flat surface and a slanted bottom flat surface.

16. A rotorcraft comprising:
   a fuselage;
   a main rotor rotatable relative to the fuselage, the main rotor including a plurality of rotor blades each having a receiving portion located in a leading section of a tip region; and
   a plurality of inertia weight assemblies each disposed within one of the receiving portions of the rotor blades, each inertia weight assembly including:
   a casing having a closed outboard end to form a cavity; and a weighted core disposed in the cavity such that the casing at least partially encloses the weighted core;
   wherein, the casing is interposed between the weighted core and the receiving portion of the rotor blade; and
   wherein, the casing is formed from a woven metallic material and
   wherein, the casing includes at least one of: vent holes, ribs, or tension carrying rods installed prior to pouring the weighted core into the cavity.

\* \* \* \* \*